United States Patent [19]

Keller et al.

[11] Patent Number: 4,503,717
[45] Date of Patent: Mar. 12, 1985

[54] SHOCK ACTUATED UNIT

[75] Inventors: William F. Keller, West Covina; Richard D. Sibley, Anaheim, both of Calif.

[73] Assignee: Koso International, Inc., Sante Fe Springs, Calif.

[21] Appl. No.: 420,008

[22] Filed: Sep. 20, 1982

[51] Int. Cl.³ .................. G05G 17/00; F16K 17/36; F16K 31/53
[52] U.S. Cl. ........................... 74/2; 74/626; 74/802; 137/38; 251/73; 251/74
[58] Field of Search .............. 74/2, 626, 802, 762; 137/38; 185/39; 251/73, 74

[56] References Cited

U.S. PATENT DOCUMENTS

| | | | |
|---|---|---|---|
| 1,793,228 | 2/1931 | Hackethal | 74/626 |
| 1,831,021 | 11/1931 | Markel | 251/73 X |
| 2,621,544 | 12/1952 | Rossmann | 74/626 |
| 2,669,257 | 2/1954 | Ramsay | 251/73 |
| 2,997,052 | 8/1961 | Mangini | 251/74 X |
| 3,113,473 | 12/1963 | Morlen | 74/2 X |
| 4,007,643 | 2/1977 | Matsushita | 74/2 |
| 4,185,507 | 1/1980 | Domyan | 74/2 |

OTHER PUBLICATIONS

"Greer Fail Safe Actuators", Greer Rotary Actuator Division, Bulletin No. 8151, Reissued 4/81.

Primary Examiner—Allan D. Herrmann
Attorney, Agent, or Firm—William P. Green

[57] ABSTRACT

A seismic actuator preferably including a differential gear mechanism having an output connected to a valve or other element to be controlled, an input connected to a manually operated member, and an input/output connected to a power unit which acts automatically upon subjection of the apparatus to shock forces to actuate the controlled member, with the differential gear mechanism functioning to permit operation of the controlled element by either the manually operated member or the automatic power unit, and also enabling resetting of the power unit by the manual member. The apparatus may include a source of pressure fluid and valve means responsive to shock forces to control the delivery of pressure fluid to a power unit in a manner causing the power unit to actuate the controlled element when the shock forces are encountered.

18 Claims, 15 Drawing Figures

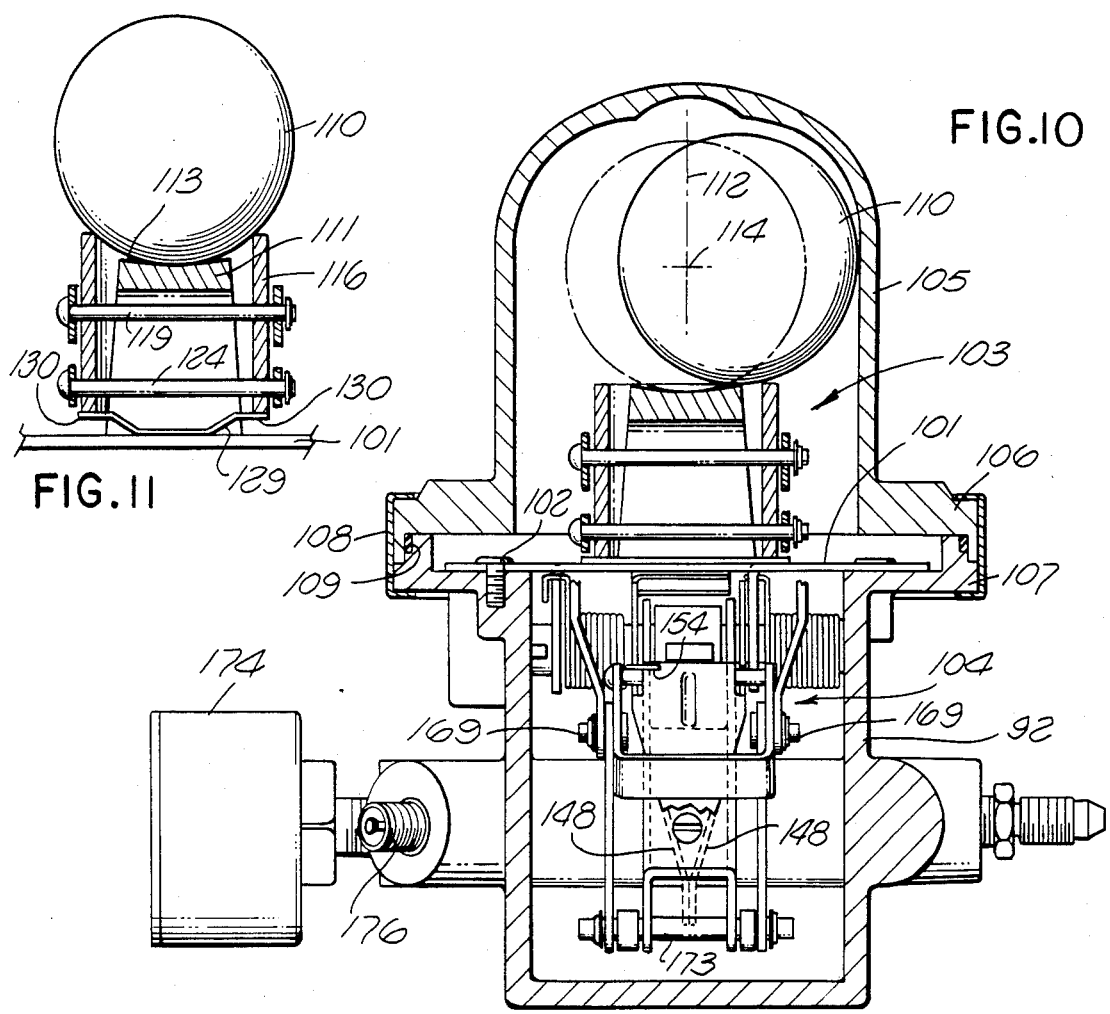
FIG.11
FIG.10
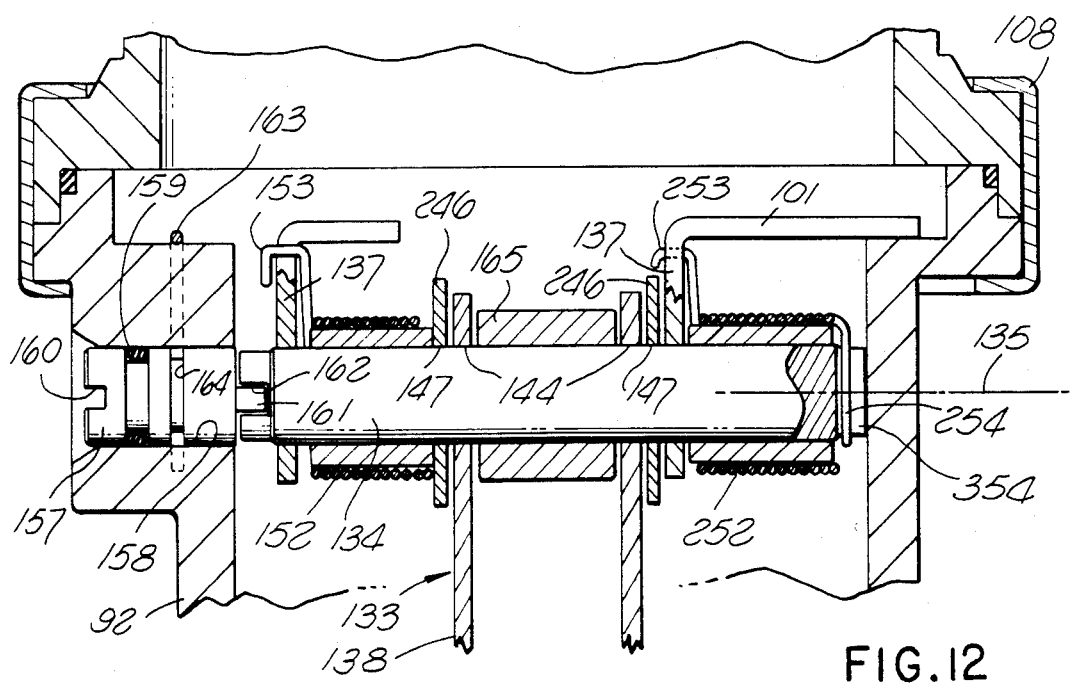
FIG.12

SHOCK ACTUATED UNIT

BACKGROUND OF THE INVENTION

This invention relates to improved actuators for automatically operating a valve or other controlled element in response to an earthquake or other shock forces of predetermined intensity.

Various types of devices have been proposed in the past for automatically closing a valve or achieving another desired purpose in the event of an earthquake, usually with the intention of preventing or minimizing damage resultant from the quake. The most common intended use for such devices is to close off the flow of gas through a pipeline in order to prevent the development or spread of fire. The devices utilize as a shock sensitive element an inertia actuated weight mounted in a housing or in association with another structure in a relation such that relative displacement between the weight and that structure automatically actuates the controlled element when seismic or other shock forces are encountered.

SUMMARY OF THE INVENTION

A purpose of the present invention is to provide a shock responsive actuator of the discussed general type which is capable of being operated either automatically upon subjection to shock forces or manually without subjection to such forces. Further, the device does not require conversion between manual and automatic conditions by operation of a clutch or clutches for making or breaking a control connection to the actuated element, as has been necessary in some prior devices. In addition, the manual operator can then be actuated to adjust the controlled valve or other controlled element to any desired intermediate position between fully open and fully closed or other extreme positions, after which the automatic shock responsive actuator can function to close the valve or move another controlled element to one of its extreme positions from that intermediate position when an earthquake or other shock force is encountered. Preferably, the manual control is so connected to the remainder of the apparatus that its setting is not affected by automatic actuation of the controlled element, to thus prevent injury to an operator which can occur if a handwheel or other manually operated element is turned by a power unit upon automatic operation of a device of this type. As an additional feature, the apparatus may be constructed to enable resetting of the automatic shock responsive portion of the device by the discussed manual operator.

A number of the discussed advantages are attained in large part by utilization in the actuating mechanism of a differential gear mechanism, having an output connected to the controlled element, an output connected to the manual operator, and an input/output connected to a power operated unit for actuating the controlled element upon subjection to shock forces. The differential gear mechanism is desirably a planetary gear system, in which the planet carrier may function as the input/output element connected to the power unit. The power unit may be spring actuated in a direction to operate the controlled element, and be retained against movement in that direction by releasable latch means.

Certain additional features of the invention relate to the preferred construction of the apparatus in a manner enabling it to respond to shock forces and apply power to the controlled element without the necessity for delivery of electrical energy to the system, to thus permit shock induced operation regardless of whether the delivery of electrical energy to the site may have been interrupted by an earthquake or the like. For this purpose, the apparatus preferably includes a source of compressed air or other pressurized fluid, whose flow may be controlled by a valve actuated by the shock sensitive element, and with the power operated unit for actuating the controlled element being designed to respond to a change in flow of the pressure fluid caused upon actuation of the valve. The pressure fluid may function to release the previously mentioned latch means, and to apply pressure to a piston which functions to move a latched part slightly in order to facilitate such release of the latch means.

BRIEF DESCRIPTION OF THE DRAWINGS

The above and other features and objects of the invention will be better understood from the following detailed description of the typical embodiments illustrated in the accompanying drawings in which:

FIG. 2A is an enlarged section taken on line 2A—2A of FIG. 2;

FIG. 10 is a vertical section taken on line 10—10 of FIG. 7 and showing the ball in a laterally displayed condition;

FIG. 11 shows a portion of FIG. 10 with the ball in its center position;

FIG. 12 is a fragmentary vertical section taken on line 12—12 of FIG. 9A; and

DESCRIPTION OF THE PREFERRED EMBODIMENT

Figure 1:
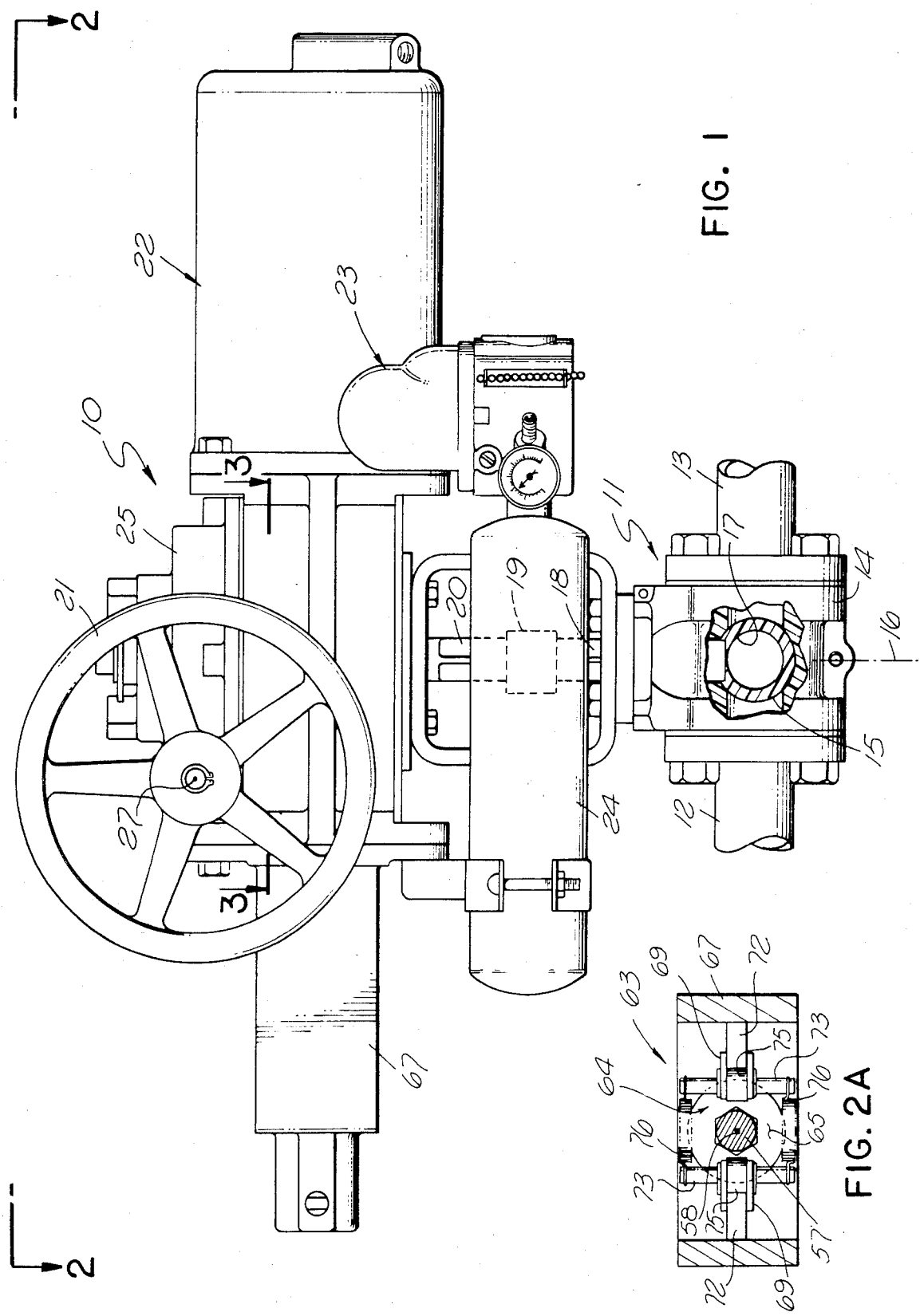
FIG. 1 is a front elevational view of a valve actuator constructed in accordance with the invention.
Figure 2:
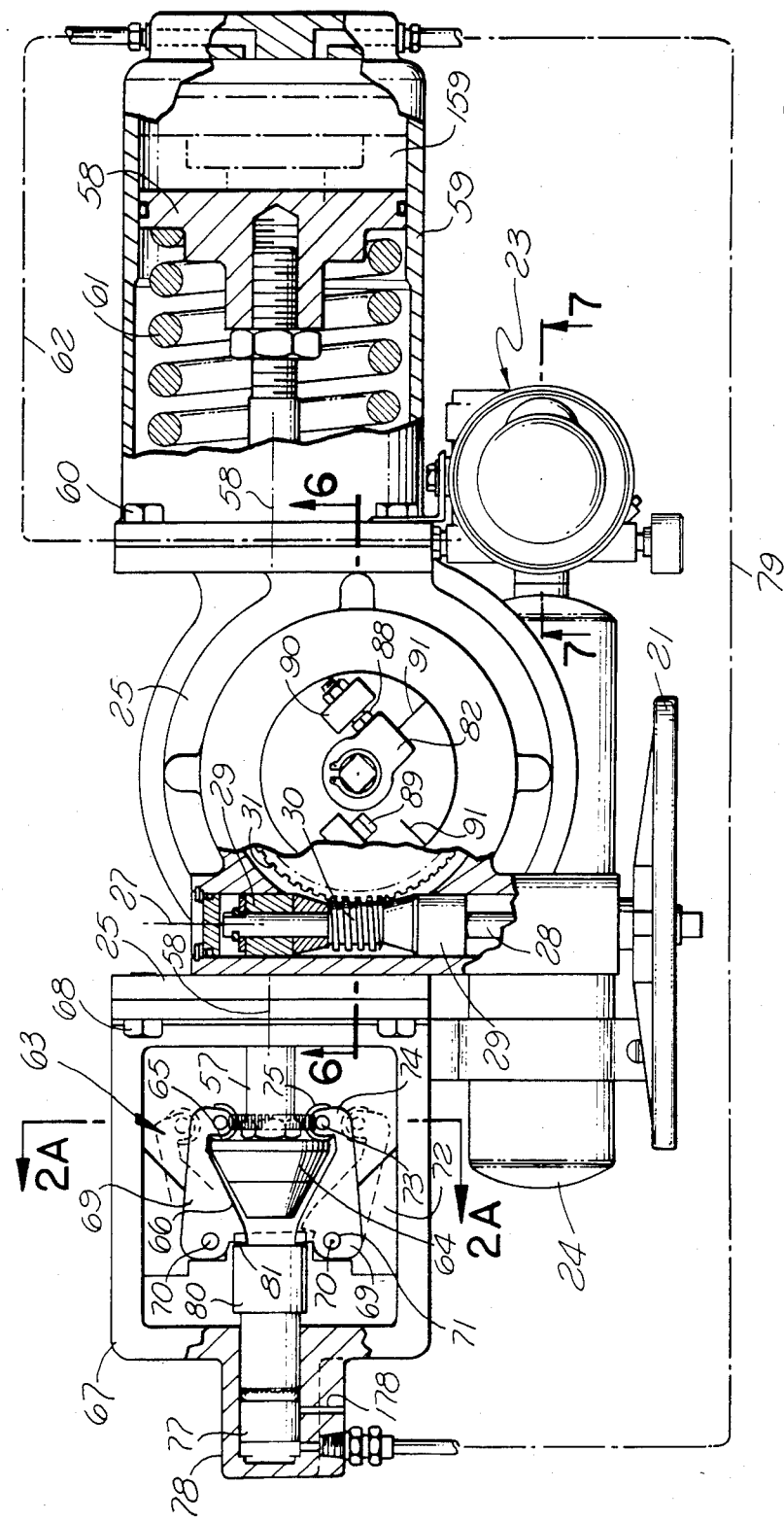
FIG. 2 is primarily a top plan view of the actuator with portions of the device broken away and shown in section.

Referring first to FIGS. 1 and 2, the illustrated actuator 10 is designed for operating a valve 11 controlling the flow of gas or another fluid from an inlet line 12 to an outlet 13. The valve is typically illustrated as of the rotary type, including a valve body 14 within which a spherical valve element 15 is mounted for rotation about a vertical axis 16 through ninety degrees to turn a passage 17 extending through the valve element between an open position of alignment with the inlet and outlet passages and a closed position in which passage 17 extends transversely and does not provide communication from inlet 12 to outlet 13. The ball is turned about axis 16 by rotation of an upwardly projecting stem 18 connected by a suitable coupling 19 to a vertical output shaft 20 of the actuator 10.

Shaft 20 is adapted to be turned manually by rotation of a handwheel 21, and to be operated automatically by a power operated unit 22 under the control of a shock responsive unit 23. Compressed air at a suitable super atmospheric pressure is contained within a tank 24, and is released to cause actuation of power unit 22 when earthquake or other shock forces are encountered. The main housing 25 of the device contains a planetary differential gear mechanism 26 having its three input/outputs connected to handwheel 21, power operated unit 22 and valve actuating output shaft 20 respectively.

Handwheel 21 may be manually turned about a horizontal axis 27 to correspondingly rotate about that axis a horizontal shaft 28 which is journalled for such rotation and retained against axial movement by bearings 29, and which has a worm portion 30 engaging a worm gear 31 to rotate that gear about the previously mentioned vertical axis 16 relative to housing 25. As will be understood, the worm gear drive functions as a speed reduction mechanism acting to turn gear 30 very slowly about axis 16 as compared with the rate of manual rotation of shaft 28 about axis 27. Such a worm gear drive will permit transmission of power in one direction, but not the reverse direction, and more specifically will permit shaft 28 to turn worm gear 31 while acting as a brake in the opposite direction preventing rotation of shaft 28 as a result of torque applied to worm gear 31 about axis 16.

The worm gear 31 is disposed about a sleeve 32, and is fixed against rotation relative thereto by a key 33. The sleeve is appropriately mounted for rotation about axis 16 with the worm gear by reception of the sleeve within a cylindrical bearing passage 34 in the top wall of housing 25, and by reception of the sleeve about a reduced diameter upper portion 35 of the vertical shaft 20 whose lower end is connected to and turns valve 15. Sleeve 32 carries at its lower end a gear 36, keyed to the shaft at 37. Sleeve 32 functions as an input to the differential gear mechanism 26, and the gear 36 is one of the input gears of that mechanism. A gear 38 disposed about the larger diameter portion 39 of shaft 20 and keyed thereto at 40 acts as an output gear of the differential mechanism for turning the output element 20 and the controlled valve. Also disposed about and rotatable relative thereto about axis 16 is a planet carrier or spider 41 formed of two similar upper and lower horizontal plates 42 and 43 rigidly secured together by screws 44 and held in spaced relation by spacer tubes 45, with gear 38 being received between these two plates. Plates 42 and 43 have inner cylindrical bearing surfaces 46 engaging the outer cylindrical surface of lower portion 39 of shaft 20 to mount the planet carrier for the desired rotary motion about shaft 20.

Two vertical shafts 47 and 48 (FIGS. 4 and 5) are mounted to planet carrier 41 for rotation therewith about the main axis 16 and for additional rotary motion about two vertical axes 49 and 50 disposed parallel to but offset from axis 16. These shafts 47 and 48 are journalled for rotation about those individual axis 49 and 50 by reception within bearing openings 51 and 52 in the two plates 42 and 43 of planet carrier 41.

Shaft 47 rigidly carries at its end a gear 53 which meshes with gear 36. At its lower end, shaft 47 rigidly carries a similar gear 54 which meshes with and drives a gear 55 which drives shaft 48. Connected rigidly to shaft 48 at a location between the upper and lower plates 42 and 43 of planet carrier 41 is a gear 56, which meshes with and drives gear 38 attached to the output shaft 20. All of the gears 36, 38, 53, 54, 55 and 56 are desirably of identical size and have the same number of teeth. At a location beneath planet carrier 41, shaft 18 may be journalled within the lower portion of housing 25 by a bushing structure 257.

Figure 4:
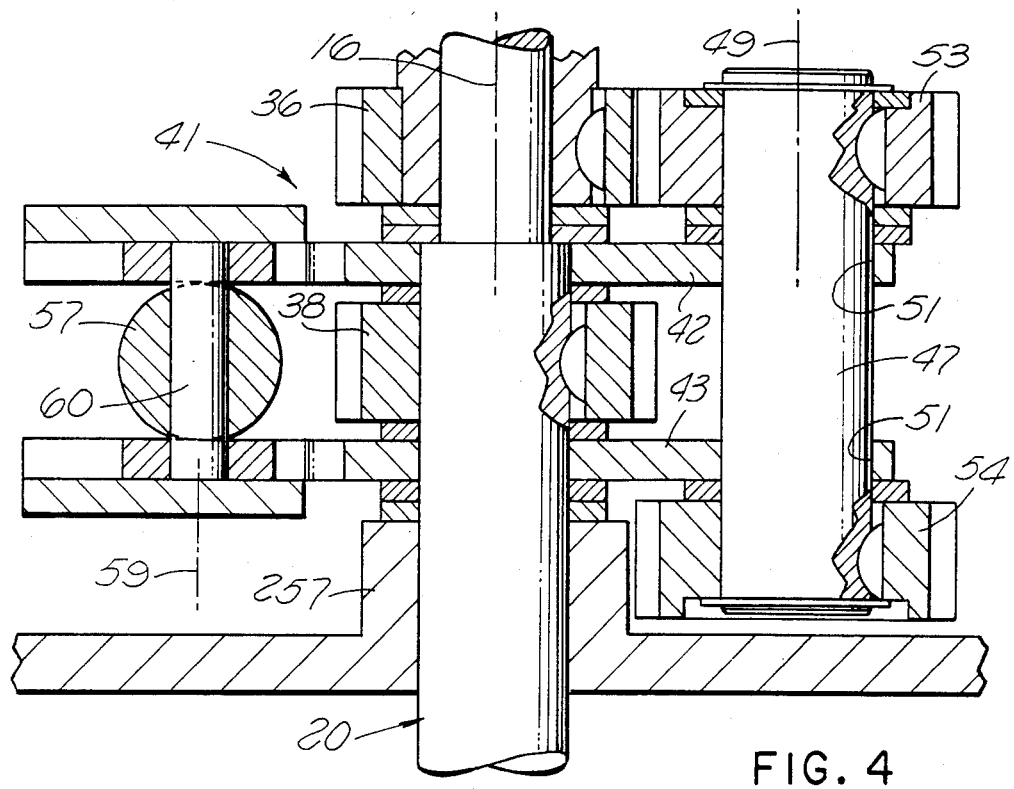
FIGS. 4 and 5 are vertical sections taken on lines 4—4 and 5—5 respectively of FIG. 3.
Figure 5:
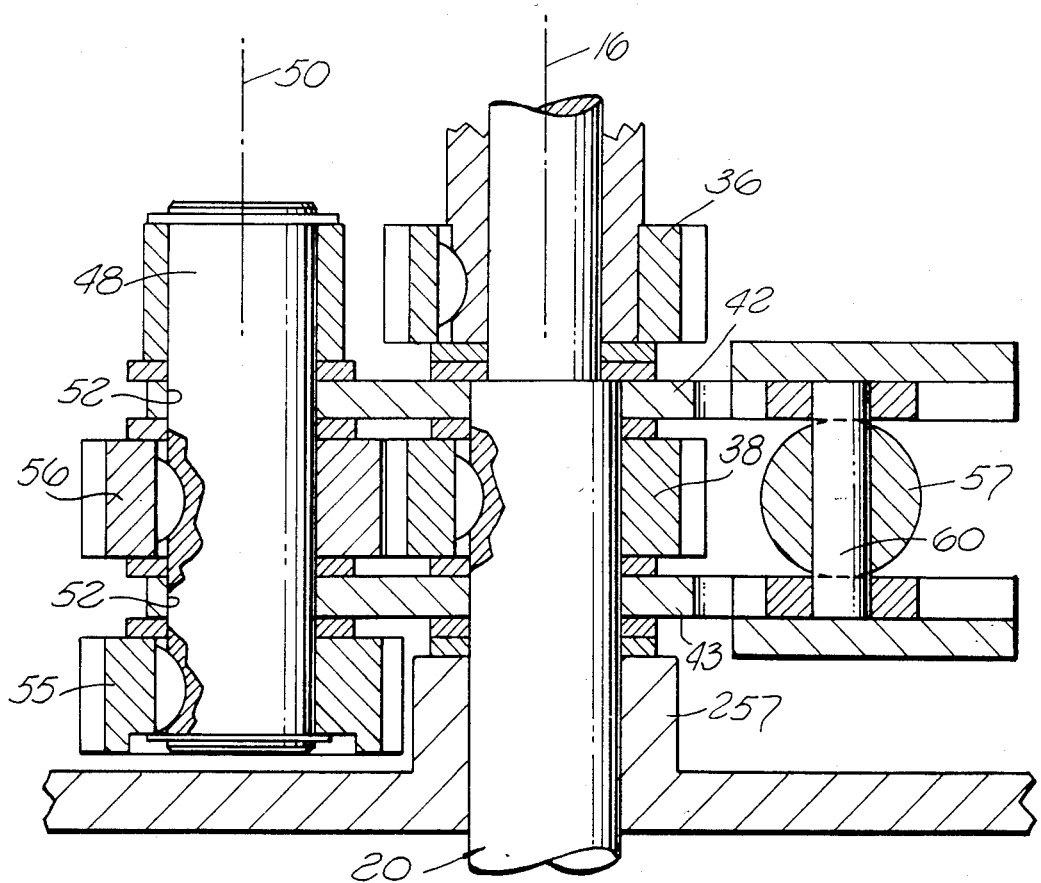

The planet carrier 41 is connected to an input/output element 57, taking the form of an elongated shaft or rod extending along a horizontal axis 58 and mounted for reciprocation in opposite directions along that axis. As seen in FIG. 4, this rod 57 is received between the upper and lower plates 42 and 43 of the planet carrier, and is connected thereto for relative pivotal movement about a vertical axis 59 by a pin 60, in a relation converting linear motion of the rod to rotary motion of the carrier about axis 16. At its right end as viewed in FIG. 2, rod 57 is connected to a piston 58 mounted for reciprocation within a cylinder 59 connected to main housing 25 of the device by bolts 60. A heavy coil spring 61 at the left side of the piston as viewed in FIG. 2 yieldingly urges it rightwardly toward its extreme rightward position, with corresponding pivotal movement of the planet carrier about axis 16. Upon shock induced actuation of the apparatus, compressed air from tank 24 is passed through shock responsive unit 23 and a line 62 into cylinder 59 at the right of piston 58, with that compressed air being at a pressure high enough to overcome the force of spring 61 and move piston 58 leftwardly against the resistance of that spring, in order to facilitate release of the piston by a latching mechanism 63 which acts against rod 57 at its opposite end.

For coaction with the latching mechanism, the left end portion of rod 57 may have an enlargement 64 typically formed as a ring of the conical configuration illustrated in FIG. 2 and rigidly attached in appropriate manner to the rod. This ring has a transverse annular shoulder surface 65 and a flaring surface 66 at its opposite axial side. The latching mechanism 63 may be mounted by a frame member 67 rigidly secured to an end of main housing 25 of the device as by bolts 68. The latching mechanism may include two similar pairs of swinging arms 69 mounted at diametrically opposite sides of axis 58 for pivotal movement about two parallel axes 70 relative to frame 67. To provide this pivotal mounting, each of the pair of arms 69 may be connected by a pivot pin 71 to a corresponding support lug 72 carried by or formed integrally with frame part 67, with the two arms 69 of each pair of arms being received at opposite sides of that lug. A rod 73 carried by the end portions 74 of the two arms of each pair carries rotatably a roller 75 having an external cylindrical surface engageable with stop shoulder 65 on ring 64. The ends of the two rods 73 are yieldingly urged toward one another to move rollers 75 into latching engagement with stop shoulder surface 65 on the piston rod by two coil springs 76 extending between the rods at their ends and maintained under tension. Upon leftward movement of piston rod 57 and the carried ring 64 as viewed in FIG. 2, surface 66 contacts rollers 75 and cams them radially outwardly away from one another and away from axis 58 to enable the ring to pass the rollers and allow their movement under the influence of springs 76 into latching engagement with shoulder 65.

The latching arms 69 and their carried rollers are adapted to be power actuated to their released positions (broken lines in FIG. 2) by actuation of a piston 77 relative to coacting cylinder 78 carried by frame part 67. Pressure fluid is delivered to cylinder 78 from the right end of cylinder 59 through a line 79. This compressed air or other pressure fluid moves the piston 77 rightwardly in a manner causing its right end portion 80 to act against shoulders 81 on latch arms 69 in a manner pivoting those arms and their carried rollers about their axes 70 and radially away from axis 58 far enough to move rollers 75 radially outwardly beyond the extremity of shoulder surface 65 to release piston 77 for rightward movement under the influence of spring 61.

Figure 6:
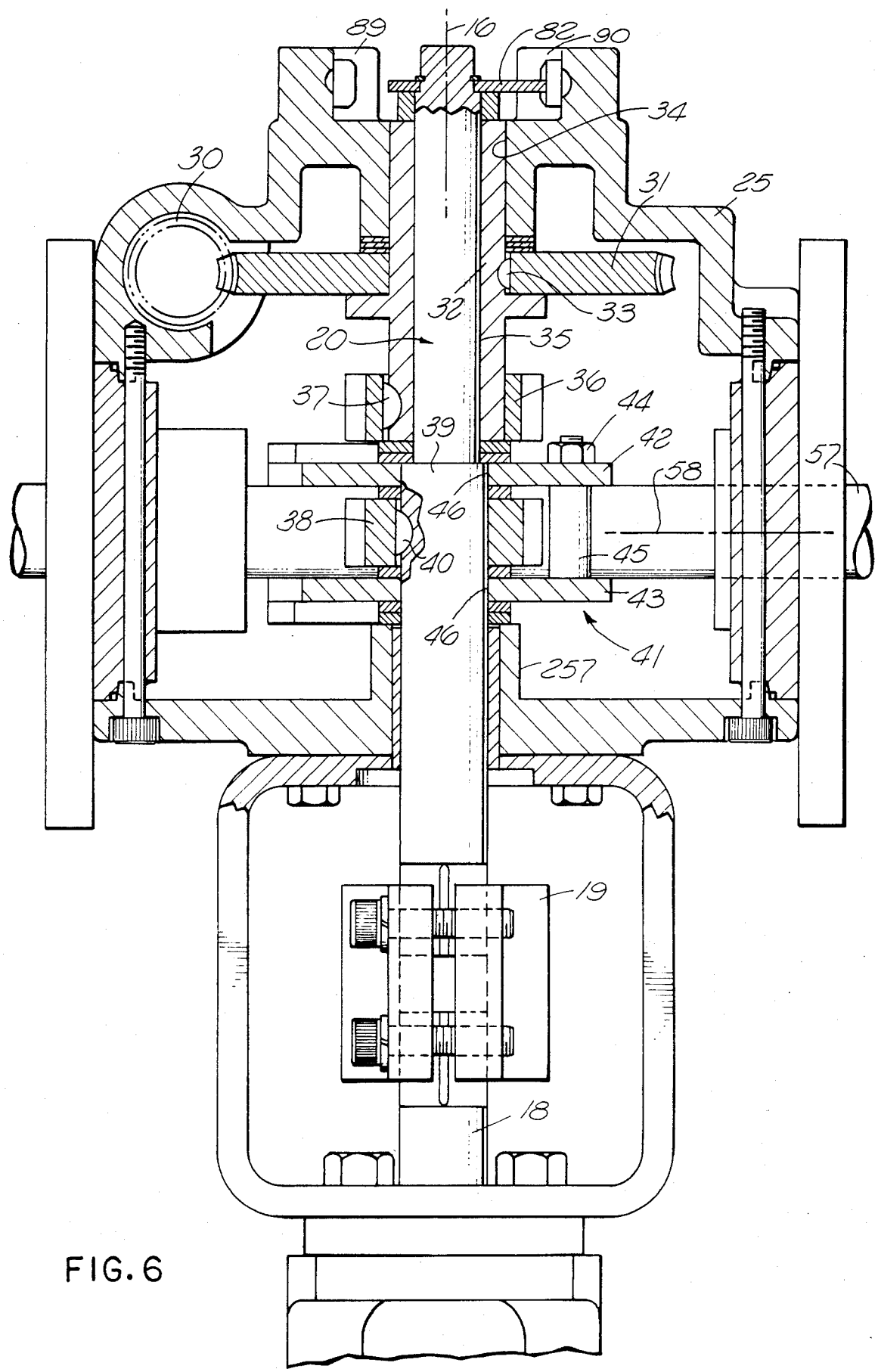
FIG. 6 is an enlarged vertical section taken on line 6—6 of FIG. 3.
Figure 7:
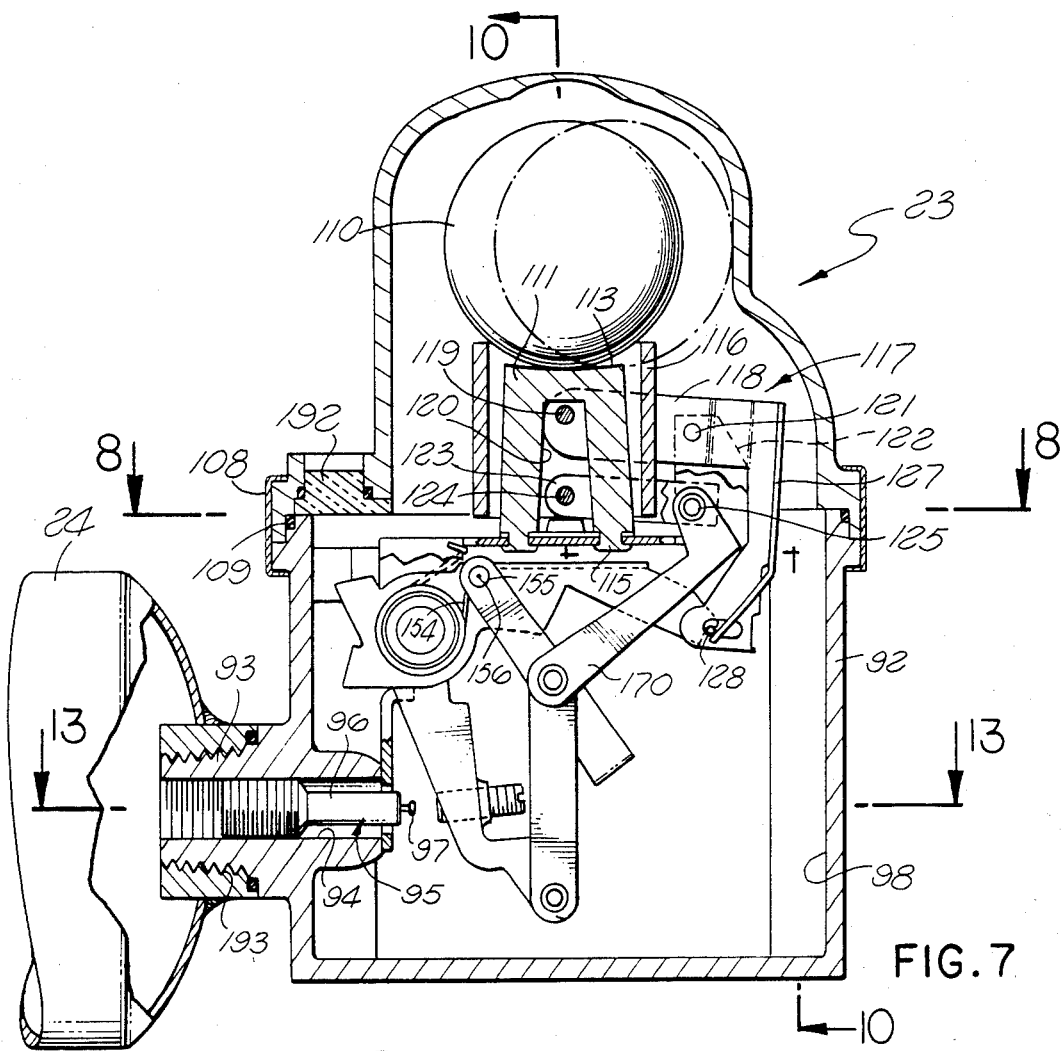
FIG. 7 is an enlarged vertical section through the shock sensing unit taken primarily on line 7—7 of FIG. 2.
Figure 8:
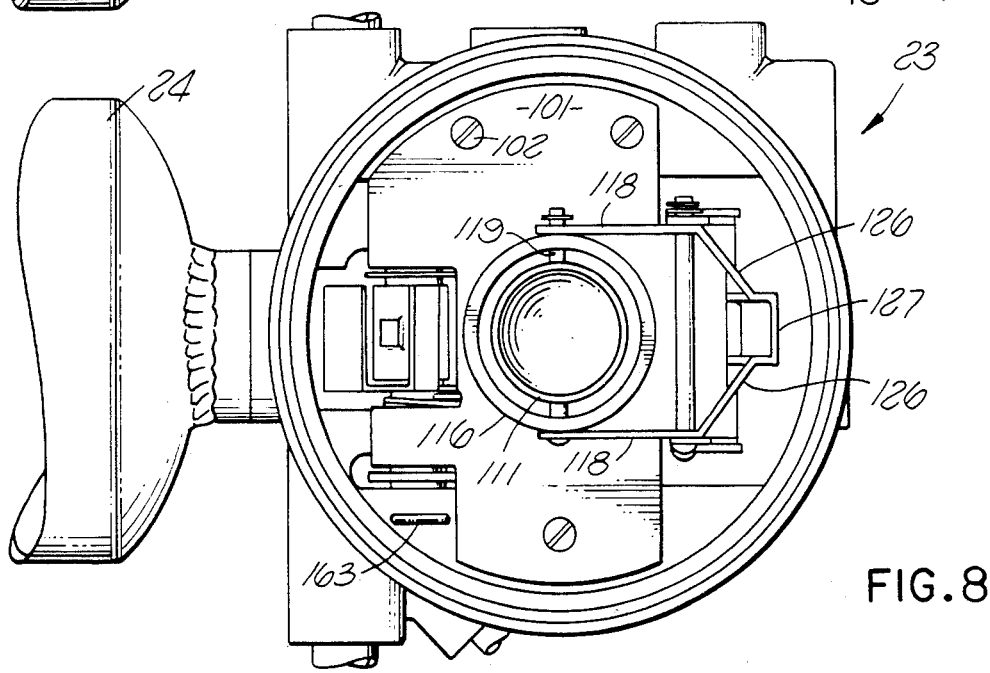
FIG. 8 is a horizontal section taken on line 8—8 of FIG. 7, with the dome and ball removed.

The setting to which valve 15 has been adjusted is indicated to an operator by the position of an arm 82 (FIGS. 2 and 6) which is carried at the upper end of shaft 20 and is keyed thereto for rotation with the shaft. This indicator arm 82 also limits rotary motion of shaft 20 and the valve to ninety degrees, by engagement of arm 82 with two stop members 88 and 89 typically taking the form of bolts connected threadedly to lugs 90 projecting upwardly from housing 25 to enable limited threaded adjustment of the stop screws for precise determination of the fully open and fully closed positions of the valves. Markings 91 on the housing 25 coact with arm 82 to indicate those valve positions.

The shock responsive unit 23 illustrated in FIGS. 7 through 13 functions to automatically admit compressed air to cylinders 59 and 78 in response to an earthquake or other shock forces of predetermined intensity. This unit 23 may have a lower hollow body section 92 with a tubular inlet portion 93 connected threadedly at 193 to the mouth of compressed air tank 24. Portion 93 of body section 92 contains a passage 94 within which an air valve 95 of the type commonly used in automobile tires and other inflatable devices is mounted. This valve 95 has a tubular body 96 containing a valve element 97 which is spring pressed rightwardly as viewed in FIG. 7 to a closed position of engagement with a shoulder in body 96 to normally prevent flow of the compressed air from tank 24 into the interior of section 92 of unit 23. Air can flow leftwardly from the chamber 98 in part 92 to fill the tank, and can flow rightwardly from the tank into chamber 98 when the stem of valve element 97 is pressed leftwardly. Air thus admitted into chamber 98 can flow through a passage 100 in a side of that chamber (FIG. 13) into line 62 leading to cylinder 59.

A mounting plate 101 extends across the upper side of chamber 98, being secured thereto by screws 102, and carries at its upper side a mechanism 103 for responding to shock forces and at its underside a related mechanism 104 which is actuable automatically by mechanism 103 to open valve 95 when the mechanism 103 is actuated by such forces. A dome shaped upper housing section 105 extends about and encloses mechanism 103, and may have a lower circular edge 106 secured detachably and peripherally to circular edge 107 of section 92 by an annular clamp structure 108, with a seal being formed between the two connected body or housing elements by annular seal ring or gasket 109.

Mechanism 103 is similar to a device illustrated in U.S. Pat. No. 4,185,507 issued Jan. 29, 1980 to Frank F. Domyan, and is also similar to a seismic actuator disclosed in copending application Ser. No. 381,329 filed May 24, 1982 by the inventors of the apparatus shown in the present application. Mechanism 103 includes a preferably spherical inertia actuated weight or mass 110 which is normally supported on a pedestal 111 projecting upwardly from and above mounting plate 101 along a vertical axis 112. The upper end of pedestal 111 contains an upwardly facing shallow recess 113 within which ball 110 is supported with its center 114 located on the vertical axis 112 of the device. The pedestal may be externally cylindrical and be secured rigidly to plate 101 by extension of lower connector lugs 115 of the pedestal through openings in plate 101, with those lugs being upset as illustrated to connect the parts rigidly together. The ball is displaceable from its FIGS. 7 and 11 position relative to the pedestal, as to the broken line position of FIG. 7 or the full line position of FIG. 10, by shock induced movement of the pedestal relative to the ball, during which movement the inertia of the weight resists movement thereof with the pedestal.

For response to this displacement of the ball, a vertical tube 116 is disposed about the pedestal and movable upwardly and downwardly relative thereto. The tube may be mounted for this vertical movement by a parallelogram mechanism 117, including two similar parallel upper links 118 each pivoted at one end to the tube by a horizontal pin 119 extending through a vertical slot 120 in pedestal 111, and each pivoted by a second parallel horizontal pin 121 to a pair of vertical bracket arms 122 projecting upwardly from plate 101. The parallelogram mechanism also includes two similar parallel lower links 123 each pivoted by a first pin 124 to the tube and by a second pin 125 to the bracket arms 122. The two upper links 118 may be stamped integrally from a single piece of sheet metal, having converging portions 126 extending from links 118 to a channel shaped portion 127 of the sheet material forming an arm projecting downwardly and carrying a cross pin 128 which acts to engage and latch the mechanism 104 at the underside of mounting plate 101 in the FIGS. 7 and 9 condition.

When inertia actuated weight 110 is displaced laterally in any direction by shock forces, it engages the upper end of tube 116 and displaces that tube downwardly in a manner causing rightward unlatching movement of pin 128. The downward movement of the tube is resisted by a leaf spring 129 (FIG. 11) which may be welded or otherwise secured at a central location to plate 101 and have end portions 130 urged upwardly by resilience of the material of the spring and applying yielding upward force to tube 116 at diametrically opposite locations.

The mechanism 104 at the underside of plate 101 includes a swinging arm 133 pivotally connected at its upper end to a horizontal shaft 134, which may in turn be mounted for rotary motion about its axis 135 by extension of the shaft through bearing openings 136 formed in two vertical parallel bracket arms 137 projecting downwardly from and formed from the material of mounting plate 101. Arm 133 may be stamped from sheet metal, defining two parallel vertical side walls 138 of arm 133 joined by a transverse portion 139 of the arm extending first generally vertically at 140 and then generally horizontally at 141. The generally vertical transverse portion 140 of arm 133 carries a valve actuating element 142 which is adapted to engage and actuate the end of the stem of valve 95, and which is connected to portion 140 threadedly at 143 to enable adjustment of the point in the swinging movement of arm 133 at which the valve will be opened. The upper portions of the two parallel side walls 138 of arm 133 contain circular openings 144 within which the externally cylindrical ting that shaft and shaft 134 to be returned by spring 252 to the full line position of FIG. 9 in which its movement is limited by engagement with an edge of portion 249 of arm 135.

Assuming that position 58 is initially in its extreme right position as viewed in FIG. 2, and that valve element 15 is initially in its open condition, hand wheel 21 is turned in a direction to first close the valve and then move piston 58 and its rod 57 leftwardly in FIG. 2 far enough to be engaged and retained against rightward movement by latching mechanism 63. More particularly, during the initial portion of this rotation of the handwheel, the worm portion 30 of handwheel shaft 28 causes rotation of worm gear 31 and the connected gear 36 in a counterclockwise direction as viewed looking downwardly (FIG. 3), with resultant clockwise rotation of gears 53 and 54, counterclockwise rotation of gears 55 and 56, and clockwise rotation of shaft 20. This rotation is continued until the controlled valve element 15 is turned through ninety degrees to its closed position, as indicated by the setting of indicator arm 82 relative to the housing of the device. When the valve reaches its fully closed position, engagement of arm 82 with stop member 89 prevents further rotation of output shaft 20 and the valve, as a result continued rotation of the handwheel in the same direction causes planet carrier 41 and the carried planet gears to swing about the main axis 16 of the differential gear mechanism in a counterclockwise direction as viewed looking downwardly in FIG. 3, with consequent leftward movement of the connected piston rod 57 and piston 58 as viewed in FIG. 2, until cam surface 66 on ring 64 carried by rod 57 engages rollers 75 of latching mechanism 63 to deflect those rollers and the connected arm 69 radially away from axis 58 far enough to allow ring 64 to pass the rollers, after which the rollers are pulled inwardly into engagement with stop surface 65 on ring 64 to latch rod 57 and the piston in their extreme lefthand positions. This leftward movement of the piston and rod 57 is effective against the resistance of spring 61, so that the rotation of the handwheel serves to cock the spring for use as a power element in closing valve 15 in response to a seismic event. After rod 57 and the spring have been latched in this condition, the handwheel can be turned in the reverse direction, and such rotation will serve to open the valve either fully or to any desired partially open condition depending upon how far the handwheel is turned. Since rod 57 is retained against axial movement during such reverse rotation of the handwheel, and the connected planet carrier 41 therefore can not turn about axis 16, the handwheel rotation acts through the various pinion gears 36, 53, 54, 55, 56 and 38 to turn valve 15 in either direction to any desired set position while the planet carrier remains stationary. Consequently, the valve can be adjusted and readjusted as many times as desired without releasing the cocked power mechanism for forcibly closing the valve in the event of an earthquake.

Figure 9:
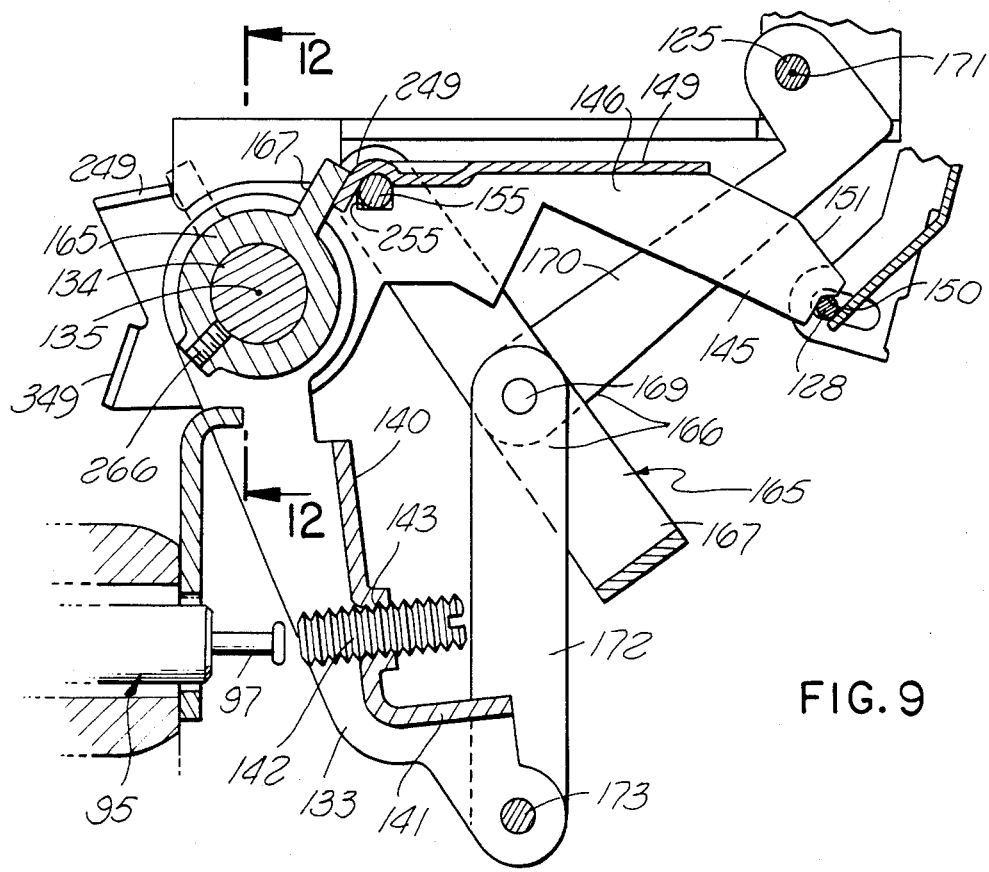
FIGS. 9A and 9B are enlarged fragmentary vertical sections taken in the plane 7—7 of FIG. 2 and showing the shock actuated mechanism in two different conditions.
Figure 9A:
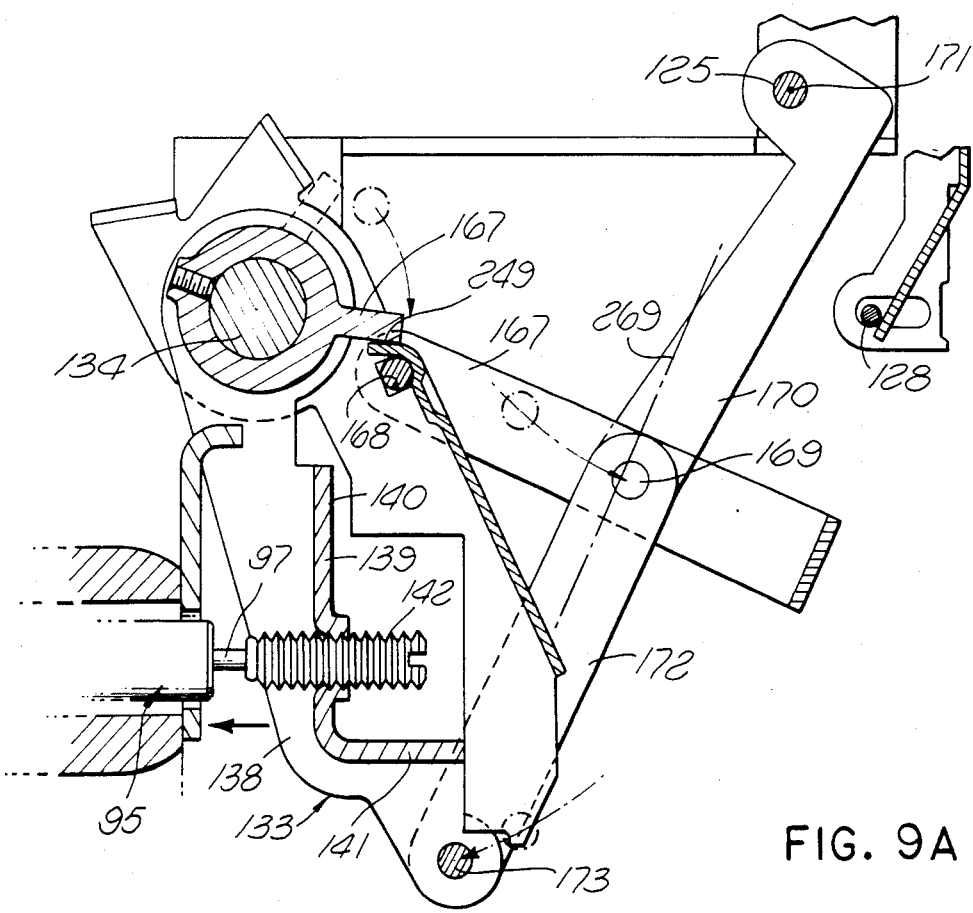
Figure 13:
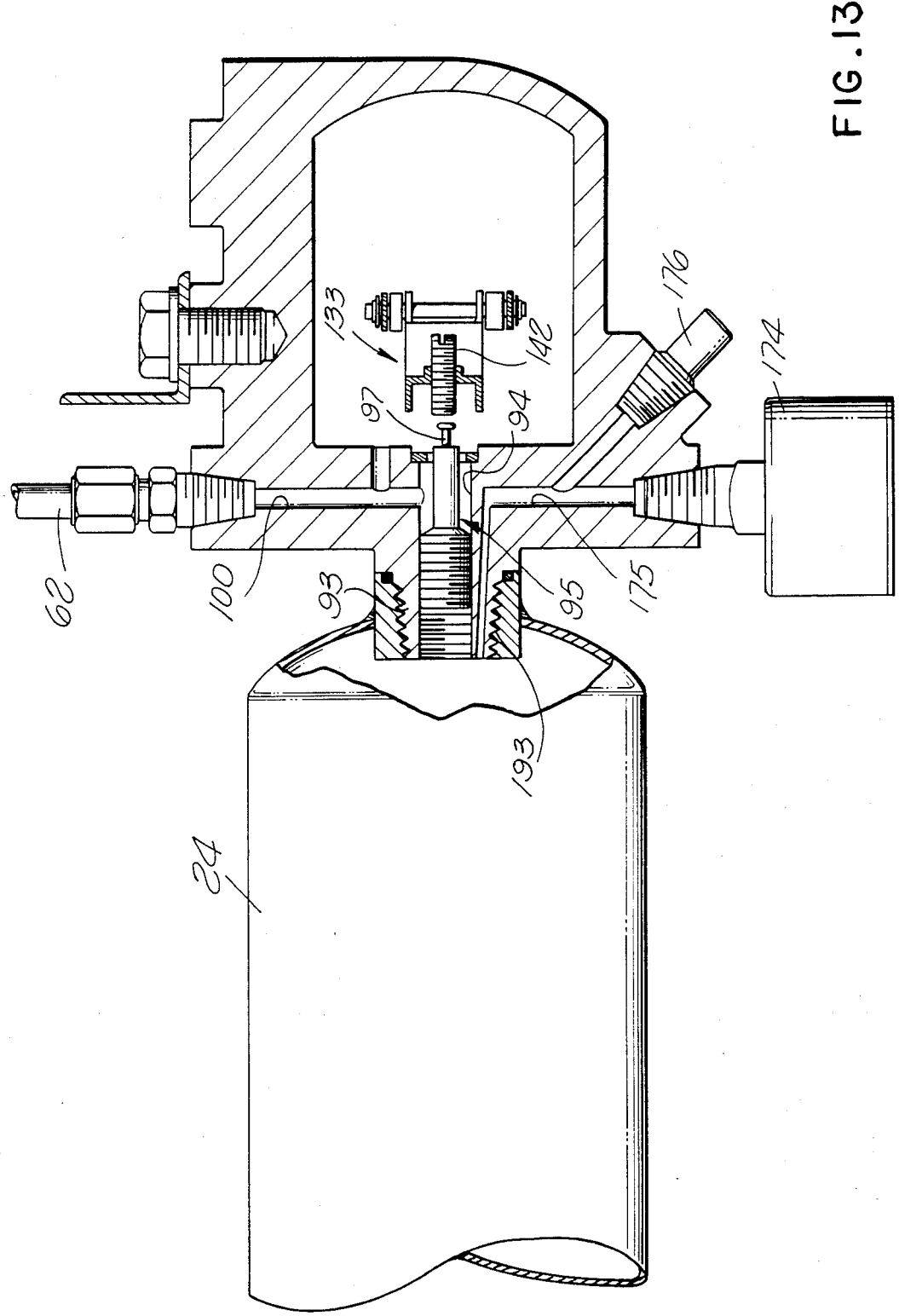
FIG. 13 is a horizontal section taken on line 13—13 of FIG. 7.

If the shock responsive unit 23 is subjected to earthquake forces of the intensity for which the apparatus is designed, those forces will displace ball 110 laterally relative to the rest of the parts of unit 23 by inertia effects, causing the ball to engage the upper edge of tube 116 and displace that tube downwardly, swinging pin 128 out of notch 150 in arm 145, and thereby freeing arm 145 for spring induced swinging movement from its FIG. 9 position to its FIG. 9A position. This swinging movement of arm 145 acts through link member 165 to cause rightward displacement of the central pivot pins 169 of the two overcenter link assemblies 166, from their FIG. 9 position to their FIG. 9A position. This displacement of the central pivot pins of the overcenter assemblies relative to the pins 125 and 173 at their upper and lower ends acts to increase the effective length of assemblies 166 between their upper pivot pins 125 and their lower pins 173, which by virtue of the fact that the upper pins are fixed relative to the housing of the device causes slight downward and leftward movement of the lower pivot pin 173 and the connected lower end portion of arm 133, moving value actuating element 142 against the stem of valve 95 to open that valve and admit compressed air from tank 24 into the interior of the housing of shock responsive unit 23. In the FIG. 9A released condition of the mechanism beneath mounting plate 103, the two links 170 and 172 of each of the assemblies 166 are preferably slightly beyond a center position, that is, the axis of their central pins 169 is slightly beyond a position of alignment with a plane 269 containing the axes of their end pins 125 and 173, to thus lock the assemblies 166 and the connected arm 133 in the FIG. 9 position and prevent unintended closure of valve 95, and to retain the valve open against the substantial pressure of the air contained within tank 24. It is contemplated that the apparatus could function without such movement to an overcenter position, with a loss in effectiveness of the locking action, but in any event axis 169 should at least reach or very closely approach the 'center' position of alignment with the axes of pins 125 and 173.

When the air from tank 24 is released into the interior of lower section 92 of the body of unit 23, that air immediately flows from chamber 98 in section 92 through line 62 into cylinder chamber 159 of cylinder 59 and from that cylinder chamber through line 79 to the interior of cylinder 78. The pressure within chamber 159 urges piston 58 leftwardly in FIG. 2 very slightly relative to latching mechanism 63, and against the force of spring 61, with this movement being just sufficient to relieve the axial force applied by shoulder 65 against rollers 75, and thereby permit those rollers to be released by rightward movement of piston 77 under the influence of the compressed air applied to the left end of that piston through line 79. The pressure within cylinder chamber 159 and cylinder 78 is allowed to gradually bleed from those cylinders through a restricted passage 178 formed in the wall of cylinder 78 at a location to be exposed by rightward movement of piston 77 which thus functions as an exhaust air valve as well as a latch actuator. The effective force of spring 61 is much greater than that of springs 76 of the latch mechanism, so that spring 61 can return piston 58 as far to the right as it can move before springs 76 acting through latch elements 69 and ring 64 can move piston 77 to the left far enough to close off the air exhaust passage 178.

Figure 3:
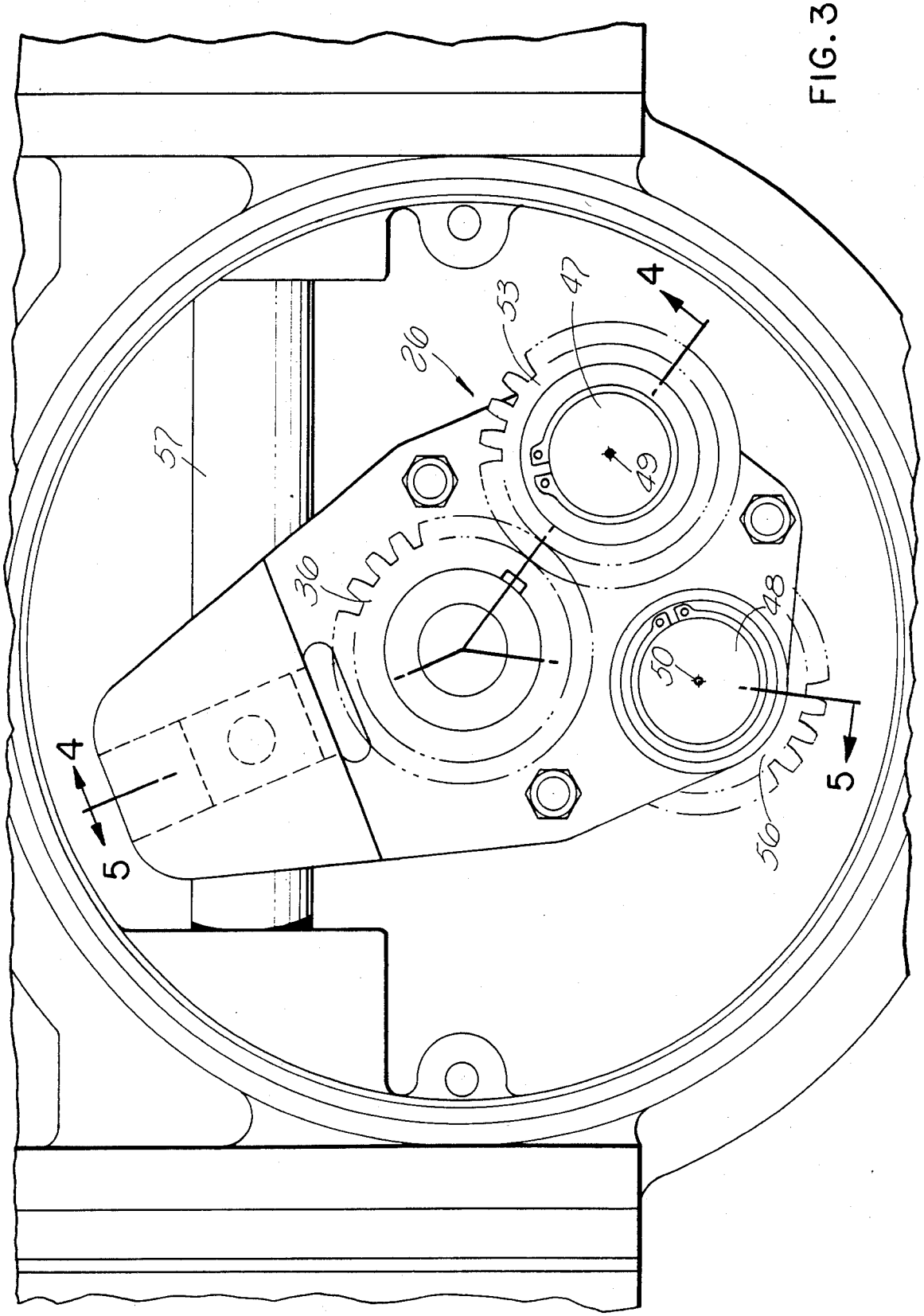
FIG. 3 is an enlarged horizontal section taken on line 3—3 of FIG. 1 and illustrating the differential gear mechanism in plan.

As piston 58 and rod 57 are moved rightwardly in FIG. 2 by spring 61, this displacement acts through rod 57 to turn planet carrier 41 in a clockwise direction as viewed in FIG. 3 acting through gears 56 and 38 to cause corresponding clockwise movement of valve 15 to its closed position. The braking effect of the worm gear drive between shaft 28 and gear 31 prevents rotation of handwheel 21 as a result of such spring induced actuation of the piston, and consequently the planet carrier acts to cause the desired rotation of the output shaft 20 connected to valve 15 without any rotation of the handwheel, thereby protecting an operator against possible injury such as might occur if the powered closure of the valve was accompanied by handwheel rotation. Regardless of what position the valve is set in prior to seismic actuation of the apparatus, that is, whether the valve is fully open or only partially open, the powered seismic induced actuation will result in full closure of the valve from that condition.

While a specific embodiment of the present invention has been disclosed as typical, the invention is of course not limited to this particular form, but rather is applicable broadly to all such variations as fall within the scope of the appended claims.

We claim:

1. A seismic actuator comprising:
    a controlled element to be actuated to different positions within a range of movement;
    a power actuated unit for moving said controlled element;
    a manually actuated handle for moving said controlled element and which is positioned to be engaged and moved by an operator's hands;
    a differential gear mechanism having an output connected to said controlled element to actuate it, a first input connected to said handle for manual actuation of said element by said handle through said differential gear mechanism, and a second input connected to said power actuated unit for actuation of said element by said unit through said differential gear mechanism; and
    shock responsive means operable automatically when subjected to mechanical shock forces to cause actuation of said controlled element by said power actuated unit.

2. A seismic actuator as recited in claim 1, in which said differential gear mechanism is a planetary gear assembly having two gears comprising said output and said first input and having a planet carrier comprising said second input and carrying planet gears.

3. A seismic actuator comprising:
    a controlled element to be actuated to different positions within a range of movement;
    a power actuated unit for moving said controlled element;
    a manually actuated handle for moving said controlled element and which is positioned to be engaged and moved by an opertor's hands;
    a differential gear mechanism having an output connected to said controlled element to actuate it, an input connected to said handle for manual actuation of said element by said handle through said differential gear mechanism, and input/output connected to said power actuated unit in a relation enabling said handle to reset said power actuated unit enabling said power actuated unit to actuate said element through said differential gear mechanism; and
    shock responsive means operable automatically when subjected to mechanical shock forces to cause actuation of said controlled element by said power actuated unit.

4. A seismic actuator as recited in claim 3, including a mechanical connection between said manually actuated handle and said input of the differential gear mechanism enabling operation of said input by said manually actuated handle but preventing movement of said handle by said input.

5. A seismic actuator as recited in claim 3, including a worm-worm gear drive between said manually actuated handle and said input of said differential gear mechanism permitting operation of said input by said handle but preventing movement of said handle by said input.

6. A seismic actuator as recited in claim 3, in which said power actuated unit includes yielding means for urging said controlled element in a predetermined direction and adapted to be released by said shock responsive means to effect movement of the controlled element by said yielding means.

7. A seismic actuator as recited in claim 3, in which said power actuated unit is responsive to a change in fluid pressure to move said controlled element toward a predetermined position, said shock responsive means including a valve automatically actuable upon subjection of said means to shock forces to control delivery of a pressure fluid to said power actuated unit in a manner causing actuation of said controlled element thereby.

8. A seismic actuator as recited in claim 3, in which said differential gear mechanism is a planetary gear system.

9. A seismic actuator as recited in claim 3, in which said input and output of said differential gear mechanism include first and second gears respectively, said input/output of said mechanism including a planet carrier connected to said power actuated unit and carrying planet means engaging said first and second gears.

10. A seismic actuator as recited in claim 9, including a worm-worm gear drive between said maually actuated handle and said first gear of the differential gear mechanism.

11. A seismic actuator comprising:
    a controlled element to be actuated to different positions within a range of movement;
    a power operated unit for moving said controlled element;
    shock responsive means operable when subjected to mechanical shock forces to cause actuation of said controlled element by said power operated unit;
    a manually actuated member for moving said controlled element; and
    a differential gear mechanism having an output connected to said controlled element to actuate it, an input connected to said manually actuated member for operation thereby, and an input/output connected to said power operated unit;
    said power operated unit including a part mounted for movement in opposite directions and connected to said input/output of said differential gear mechanism, spring means yieldingly urging said part in one of said directions, and latch means for releasably retaining said part against movement in said one direction and adapted to be released by said shock responsive means.

12. A seismic actuator comprising:
    a controlled element to be actuated to different positions within a range of movement;
    a power operated unit for moving said controlled element;
    shock responsive means operable when subjected to mechanical shock forces to cause actuation of said controlled element by said power operated unit;
    a manually actuated member for moving said controlled element;
    a differential gear mechanism having an output connected to said controlled element to actuate it, an input connected to said manually actuated member for operation thereby, and an input/output connected to said power operated unit;

said power operated unit including a piston operable by movement in opposite directions to actuate said input/output of the differential gear mechanism, spring means yieldingly urging said piston in one of said directions, and latch means for releasably retaining said piston against movement in said one direction;

a source of pressure fluid; and fluid actuated means for releasing said latch means;

said shock responsive means including valve means operable automatically upon subjection of said shock responsive means to shock forces to admit pressure fluid from said source thereof to said fluid pressure actuated means for releasing the latch means.

13. A seismic actuator as recited in claim 12, in which said valve means act also to admit pressure fluid to a side of said piston for urging it in a direction facilitating release of said latch means.

14. A seismic actuator as recited in claim 13, in which said input and output of the differential gear mechanism include first and second gears respectively, said mechanism including a planet carrier connected to said input/output, and planet gear means carried by said carrier and engaging said first and second gears.

15. A seismic actuator as recited in claim 14, including worm-worm gear drive between said manually actuated member and said first gear of the differential gear mechanism enabling actuation of said first gear by said manually actuated member but preventing operation of the manually actuated member by said first gear.

16. A seismic actuator comprising:

a controlled element to be actuated to different positions within a range of movement;

a power operated unit for moving said controlled element;

shock responsive means operable when subjected to mechanical shock forces to cause actuation of said controlled element by said power operated unit;

a manually actuated member for moving said controlled element; and a differential gear mechanism having an output connected to said controlled element to actuate it, an input connected to said manually actuated member for operation thereby, and an input/output connected to said power operated unit;

said differential gear mechanism including a planet carrier and planet gear means carried thereby;

said power actuated unit including a rod mounted for longitudinal reciprocating movement along a predetermined axis and pivotally connected to said planet carrier for linear movement in correspondence with rotary movement of the carrier.

17. A seismic actuator comprising:

a pressure fluid source;

a controlled element to be moved to different positions;

shock responsive means;

valve means automatically actuable by said shock responsive means upon subjection to shock forces to produce a change in fluid pressure from said source; and power operated means responsive to said change in fluid pressure from said source upon actuation of said valve means by said shock responsive means to actuate said controlled element;

said power operated means including an actuating member yieldingly urged in a first direction and operable upon movement in said first direction to actuate said controlled element, latch means for releasably retaining said actuating member against movement in said first direction, and means operable by pressure fluid admitted from said source through said valve means to release said latch means when said shock responsive means are subjected to shock forces.

18. A seismic actuator as recited in claim 17, in which said actuating member is a piston to which pressure fluid is admitted by said valve means upon subjection of said shock responsive means to shock forces and actuable in a direction the opposite of said first direction by said pressure fluid to facilitate release of said latch means.

* * * * *